United States Patent

[11] 3,622,196

| [72] | Inventor | Salvatore S. Sarra<br>Fond Du Lac, Wis. |
|---|---|---|
| [21] | Appl. No. | 2,715 |
| [22] | Filed | Jan. 14, 1970 |
| [45] | Patented | Nov. 23, 1971 |
| [73] | Assignee | Brunswick Corporation<br>Chicago, Ill. |

[54] WINDSHIELD FOR SNOW VEHICLE
13 Claims, 7 Drawing Figs.

[52] U.S. Cl. .................................................. 296/90, 180/5 R
[51] Int. Cl. .................................................. B60j 1/02
[50] Field of Search ........................................... 296/84 R, 84 N, 78.1, 90, 92; 180/5; 9/1 R

[56] References Cited
UNITED STATES PATENTS

| 2,025,596 | 12/1935 | Kraft .......................... | 297/84 N |
| 3,376,586 | 4/1968 | Forsyth et al. ................ | 9/1 |

FOREIGN PATENTS

| 984,661 | 2/1951 | France ...................... | 296/78.1 |
| 167,239 | 7/1921 | Great Britain ............... | 296/78.1 |

Primary Examiner—Leo Friaglia
Assistant Examiner—John A. Pekar
Attorney—Roy T. Montgomery ABSTRACT: A windshield for a snow vehicle which is pivotable from an operative position into a stowed position on the seat. Arms interconnect the pivot points to the corners of the windshield which allow the corners to drop when the windshield is stowed so that the windshield is substantially within the profile of the cowl.

INVENTOR.
SALVATORE S. SARRA
BY Roy L. Montgomery
ATTORNEY

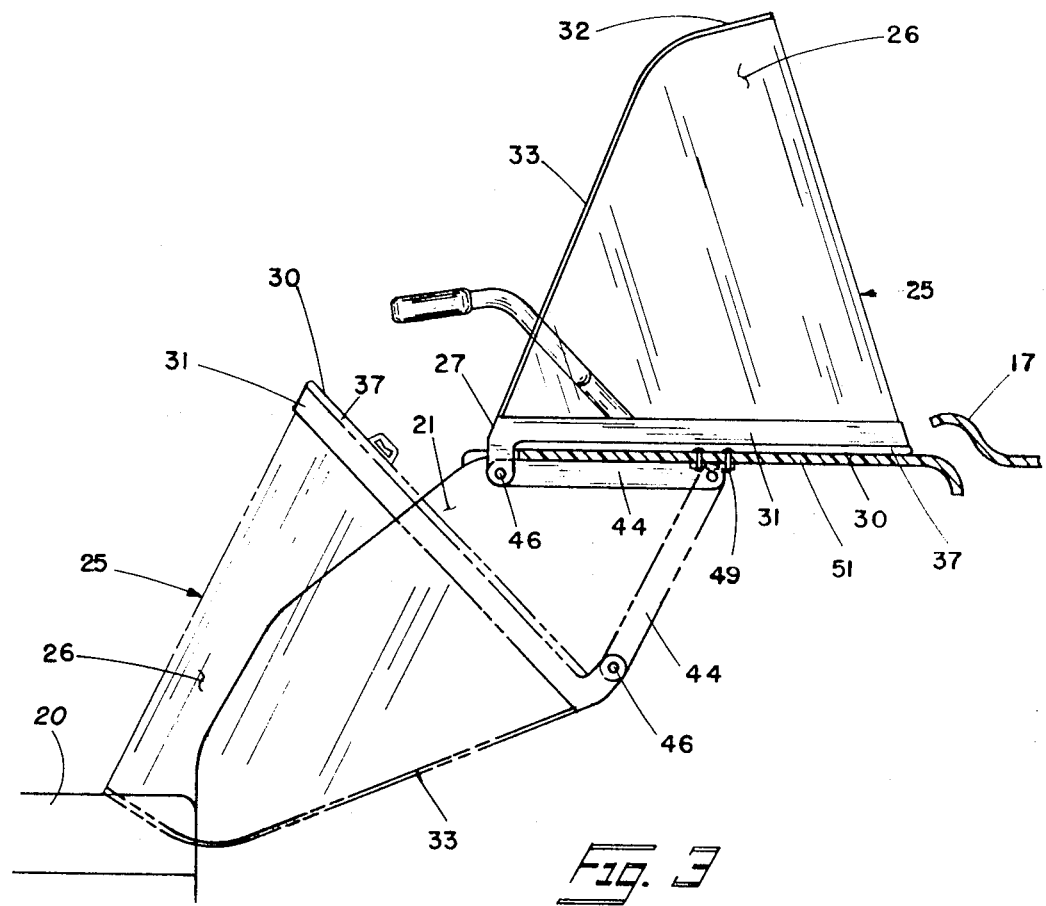
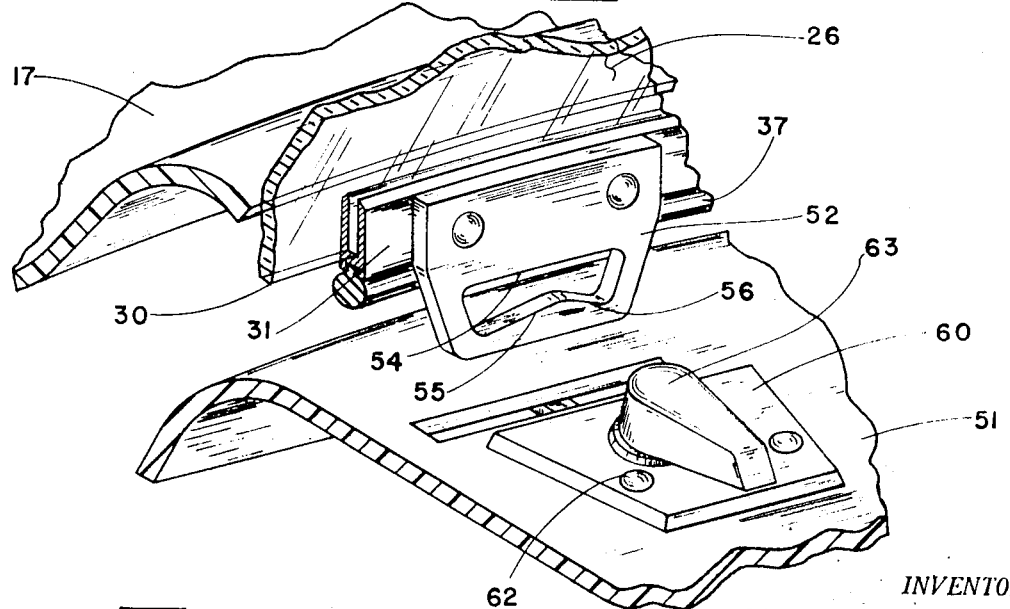

INVENTOR.
SALVATORE S. SARRA
BY Roy L. Montgomery
ATTORNEY 3,622,196

WINDSHIELD FOR SNOW VEHICLE

BACKGROUND OF THE INVENTION

This invention pertains to devices for mounting a windshield on a snow vehicle.

Conventional snow vehicles have windshields which are fixed in an up or operative position.

SUMMARY OF THE INVENTION

The windshield of this invention has a pair of arms connected to the corners. These arms are pivotally connected to either the front cowl assembly or the dashboard assembly. By connecting the corners of the windshield through arms, the windshield will pivot down onto the seat when stowed to a position substantially within the profile of the cowl.

The present invention allows a snow vehicle to be shipped in a relatively small container without requiring the receiver to assemble the windshield. Also, the vehicle can readily be stored in a small space, transported in a normal size station wagon, and, when trailered, can be pivoted to the stowed position to substantially reduce wind resistance.

BRIEF DESCRIPTION OF THE DRAWINGS

FIG. 3 is a plane view of a windshield mounted on the dashboard assembly with portions in section.

FIG. 4 is a perspective view of the means for releasably locking the windshield to the dashboard assembly with parts in section.

DESCRIPTION OF THE PREFERRED EMBODIMENTS

Figure 1:
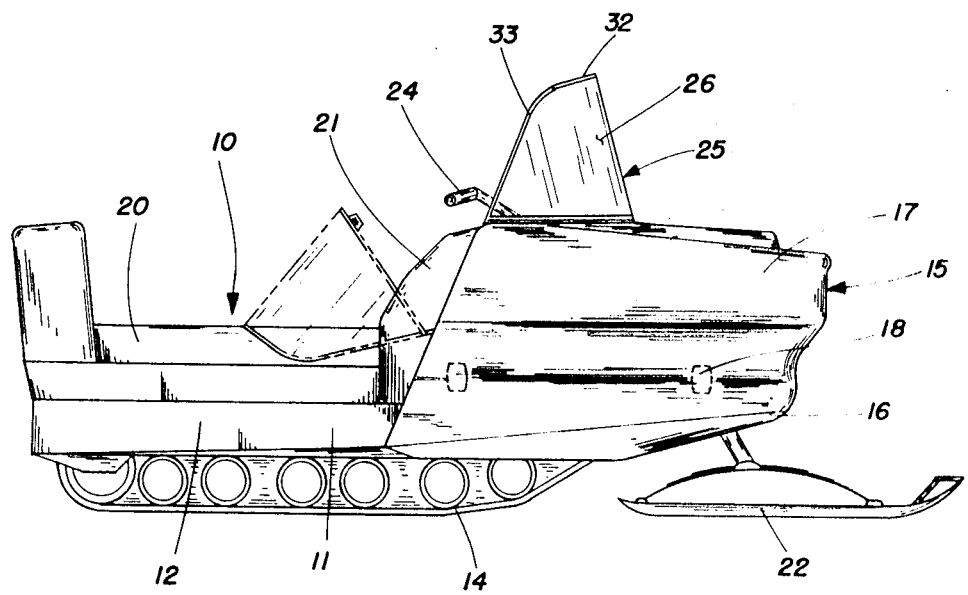
FIG. 1 is a plane view of a snow vehicle showing the windshield in its operative position by solid lines and its stowed position by chain lines.

In the drawings there is shown a snow vehicle 10 which includes a chassis 11. The chassis 11 includes an inverted U-shaped tunnel portion 12. Carried within the tunnel portion 12 is track 14 for propelling the vehicle. The track is driven by an engine (not shown) mounted on the front portion of the chassis 12 beneath the front cowl assembly 15. The front cowl assembly 15 includes a lower cowl portion 16 which is fixed to the chassis 11 and an upper portion 17 which is pivotally connected to the chassis 11 at the front end thereof to allow access to the engine for servicing. The upper cowl portion 17 may be clamped down onto the lower portion 16 by the clamps 18 along the upper edge of the lower cowl 16. Connected to the top of the tunnel portion 12 of the chassis 11 is a seat 20 for carrying passengers thereon. A dashboard assembly 21 is mounted on the chassis 11 between the seat 20 and the engine to protect the operator and provide a mounting for the necessary instrumentation. A pair of skiis 22 are connected to the vehicle and are steerable by the handlebars 24. A windshield 25 is provided to protect the operator from wind, snow and the elements.

The invention is directed to an improved mounting for the windshield 25. The windshield 25 includes a pane 26 having two rear outer corners 27, 28 with a lower edge 30 and an upper edge 32 therebetween. The pane 26 is arcuate about a generally vertical axis with the front of the lower edge 30 being substantially in front of the outer corners 27 and 28. A pair of generally vertical edges 33, 34 form a part of the upper edge 32 and connect it with the respective corners 27, 28. The windshield 25 has an operative or up position and a stowed or down position as shown in solid and phantom lines respectively in FIG. 1. The lower edge 30 of the windshield 25 includes a connector strip 31 (shown best in FIG. 4) extending therealong which carries a resilient sealing strip 37 along the bottom thereof.

Figure 2:
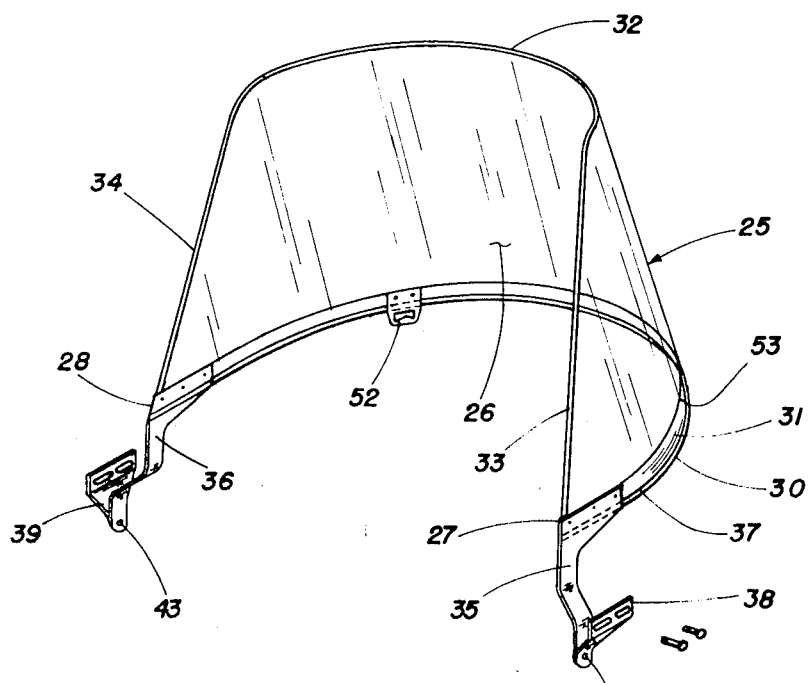
FIG. 2 is a perspective view of a windshield for mounting on the cowl.

Referring to FIGS. 1-2, in the first embodiment the windshield has a pair of arms 35, 36 fixed to each corner 27, 28 extending downwardly therefrom. A pair of bracket assemblies 38, 39 are rigidly fixed to each side of the upper portion 17 of the front cowl assembly 15 at a position below the corners 27, 28 of the windshield. The ends of the arms 35, 36 are pivotally connected to the respective brackets by pivot pins 42, 43. By providing a pair of pivot points for the windshield which is below the corners 27, 28 the windshield 25 assumes a laying down position when pivoted onto the seat 20 (FIG. 1). This is accomplished by the corners 27, 28 dropping down when the windshield 25 is stowed. Thus, when the windshield 25 is in the stowed position, it is substantially within the profile of the front cowl assembly and, as a result, adds very little or no overall height to the vehicle.

Figure 7:
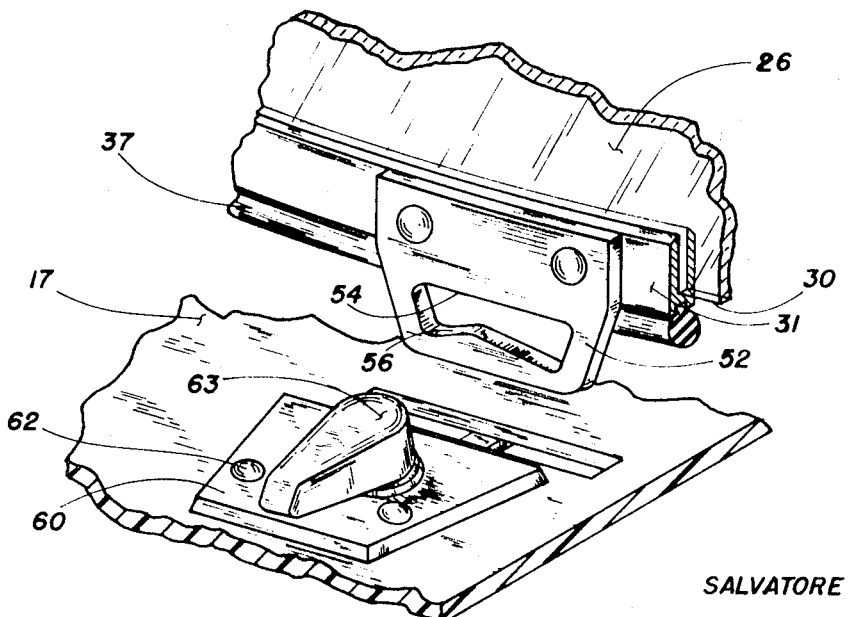
FIG. 7 is a view similar to FIG. 4 showing the means for locking the windshield to the upper cowl.

When the windshield is in the operative or up position, it is in sealing engagement with the upper portion 17 of the front cowl assembly 15 (shown best in FIG. 7). Means are provided for releasably locking the windshield in its up or operative position which will be described hereinafter. Thus, the windshield is held in its operative position when in operation and can be readily pivoted to a stowed position when desired for hauling or storing. It is also evident from FIGS. 1 and 2 that the arms 35 and 36 are carried beneath the front upper cowl portion 17 and are substantially hidden thereby. Thus, avoiding any impairment of the vehicle's styling.

Referring to the second embodiment shown in FIG. 3, the windshield 25 is shown connected to the dashboard assembly 21. Thus, the windshield remains in position on the cowl when the front upper cowl portion 17 is raised for servicing the engine.

In this embodiment, the upper portion 17 front cowl assembly 15 has a raised portion adjacent the windshield and upper cowl portion to allow air to pass into the engine compartment. Such a design also provides a covering for the windshield-locking means for a more attractive vehicle. The corners 27, 28 are pivotally connected to the arms 44, 45 (not shown) by the pivot pins 46, 47 (not shown). Bracket assemblies 49, 50 (not shown) are fixed to a generally horizontal portion 51 of the dashboard assembly 21 at a position forward of the corners 27, 28 by the length of the arms 44, 45. Thus, when the windshield 25 is in the operative position, the arms bear against the bottom of the horizontal portion 51 of the dashboard assembly, and the lower edge 30 of the windshield engages the top of the dashboard to form a relatively rigid connection.

When the windshield 25 is pivoted to its stowed position on the seat 20, the arms 44, 45 release from bearing engagement with the dashboard 21 and allow the corners 27, 28 to drop. This allows the windshield 25 to assume a laying down position, and as a result, when the windshield 25 is in its stowed position, it is substantially within the profile of the front cowl assembly 15 and adds very little or no overall height to the vehicle. Note also that the arms 44 and 45 are hidden beneath the horizontal portion 51. Thus, the styling of the vehicle is not impaired.

Figure 5:
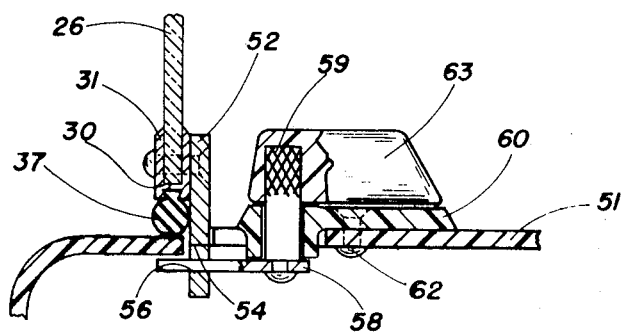
FIG. 5 is a sectional view of FIG. 4 showing the locking means with the windshield in the locked position.
Figure 6:
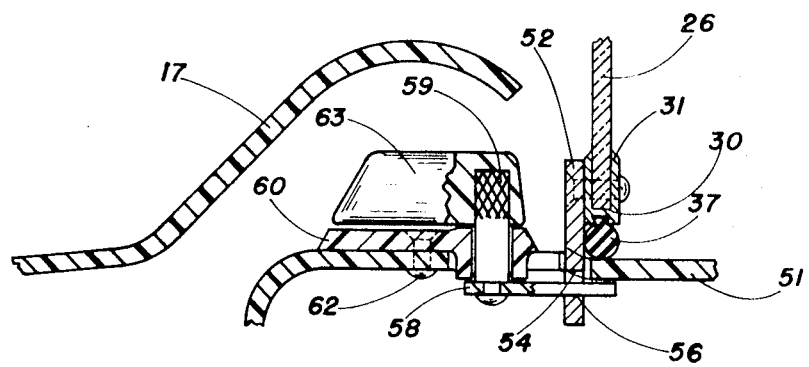
FIG. 6 is a sectional view similar to FIG. 5 showing the locking means outside the windshield and beneath the front cowl assembly.

Referring to FIGS. 4, 5 and 6, when the windshield is in the up or operative position, it is in sealing engagement with the dashboard assembly 21. Means, which will be described hereinafter, are provided for releasably locking the windshield 25 in position. Thus, the windshield 25 is locked in its operative or up position when in use and can readily be pivoted to the stowed position for hauling or storing.

The means for releasably locking the windshield 25 are generally the same whether the windshield is mounted on the dashboard assembly 21 or the front cowl assembly 15. Said means are best shown in FIG. 4. A pair of downwardly extending legs 52, 53 (FIG. 2) are fixed to the connector strip 31 at a position generally at each side of the windshield 25. Each leg 52, 53 has a generally horizontal slot 54 therein with an inclined camming lower surface 55 forming a part thereof. The camming lower surface 55 terminates in a locking surface 56 which slopes in the opposite direction from the camming surface.

A pair of horizontal cam-engaging arms 58 (FIG. 5) are pivotally mounted about a vertical axis by a pair of shafts 59. Each shaft 59 extends through a plastic body 60 which is mounted on the dashboard 21 adjacent the respective camming surfaces 55 by the rivets 62. The opposite end of each shaft 59 is fixed to a handle 63 for manual operation.

In operation the windshield is lowered until the resilient sealing strip 37 engages the dashboard assembly 21. Each handle 63 is then rotated clockwise until the arm 58 engages the respective camming surface 55 and slides across it to the locking surface 56 to force the windshield down and lock it into position.

FIG. 6 shows the cam-engaging arm 58, the body 60 and the handle 63 mounted on the dashboard 21 in a position outside the windshield 25 and beneath the upper portion of the front cowl 15. Thus, the locking means are hidden from view and do not adversely affect the appearance of the vehicle.

FIG. 7 shows a similar type of locking device as FIGS. 4, 5 and 6 but for use with the windshield described in the first embodiment of this invention. In that figure the resilient sealing strip engages the upper portion 17 of front cowl assembly 15. Also, the handle 63, body 60 and cam-engaging arm 58 are mounted on the cowl assembly 15. Thus, in this embodiment, the windshield is pivoted with the front upper cowl portion 17 when servicing the engine.

It is apparent that many modifications and variations of this invention as hereinbefore set forth may be made without departing from the scope and spirit hereof. The specific embodiments described are given by way of example only and the invention is limited only by the terms of the appended claims. For example, the mounting arrangement shown for connecting the windshield to the dashboard could very readily be used to mount the windshield to the front cowl assembly. Likewise the arrangement for mounting the windshield to the front cowl assembly could be used to mount the windshield to the dashboard.

What is claimed is:

1. In a snow vehicle having a chassis with a front cowl assembly, a dashboard assembly, and a seat fixed thereto, the improvement comprising:
   a. an arcuate windshield having two outer corners with a lower edge and an upper edge therebetween, the front of said lower edge being substantially in front of said corners, said windshield having an operative and a stowed position, the lower edge engaging one of said assemblies when said windshield is in the operative position, the upper edge engaging the seat when said windshield is in the stowed position;
   b. a pair of arms, each arm being carried by one of said corners and pivotally connected to and substantially beneath a first of said assemblies such that when said windshield is pivoted to the stowed position, said corners drop to position said windshield substantially within the profile of the cowl assembly; and
   c. means for releasably locking the windshield to said one assembly when the windshield is in the operative position.

2. The improvement of claim 1 wherein said means for locking comprises:
   a. a downwardly extending leg connected to the lower edge of the windshield and having a camming surface thereon; and
   b. a generally horizontal arm pivotally mounted on said one assembly about a generally vertical axis, said arm being mounted adjacent said camming surface for engagement therewith when the windshield is in the operative position.

3. The improvement of claim 1 wherein said one assembly is the dashboard assembly.

4. The improvement of claim 3 wherein each said arm is pivotally connected to said one corner.

5. The improvement of claim 3 wherein said means for locking comprises:
   a. a downwardly extending leg connected to lower edge of the windshield and having a camming surface thereof; and
   b. a generally horizontal arm pivotally mounted on said one assembly about a generally vertically axis, said arm being mounted to the adjacent said camming surface for engagement therewith when the windshield is in the operative position.

6. The improvement of claim 5 wherein the pivot axis of said arm is outside the windshield and beneath the front cowl assembly.

7. The improvement of claim 1 wherein said one assembly is the front cowl assembly.

8. The improvement of claim 7 wherein each said arm is rigidly connected to said one corner.

9. The improvement of claim 7 wherein said means for locking comprises:
   a. a downwardly extending leg connected to the lower edge of the windshield and having a camming surface thereon; and
   b. a generally horizontal arm pivotally mounted on said one assembly about a generally vertical axis, said arm being mounted adjacent said camming surface for engagement therewith when the windshield is in the operative position.

10. The improvement of claim 1 wherein each said arm is pivotally connected to said one corner.

11. The improvement of claim 1 wherein each said arm is rigidly connected to said one corner.

12. In a snow vehicle having a chassis with a front cowl assembly, a dashboard assembly and a seat fixed thereto, the improvement comprising:
   a. an arcuate windshield having two outer corners with a lower edge and an upper edge therebetween, the front of said lower edge being substantially in front of said corners, said windshield having an operative and a stowed position, the lower edge engaging one of said assemblies when said windshield is in the operative position, the upper edge engaging the seat when said windshield is in the stowed position;
   b. means for releasably locking the windshield to said one assembly when the windshield is in the operative position; and
   c. a pair of linking arms, each arm being pivotally connected at opposite ends thereof to one of said corners and one of said assemblies such that said windshield may be pivoted to the stowed position and, when so pivoted, said corners are lowered and the windshield is substantially within the profile of the cowl assembly substantially beneath said one assembly, and when said windshield is in the operative position, said linkage arms are in seating engagement with a bottom portion of said one assembly.

13. The improvement of claim 12 wherein said one assembly is the dashboard assembly.

* * * * *